UNITED STATES PATENT OFFICE.

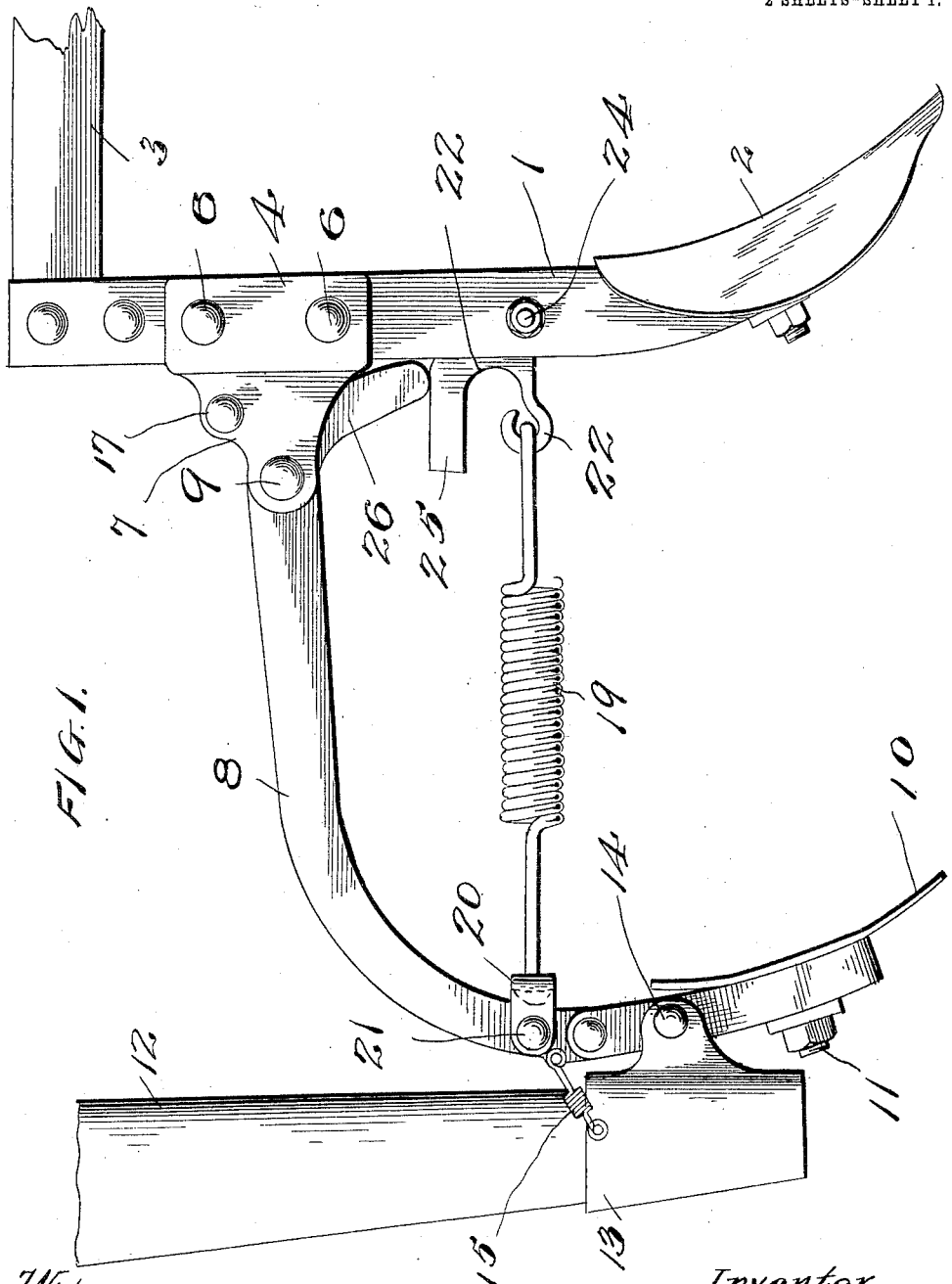

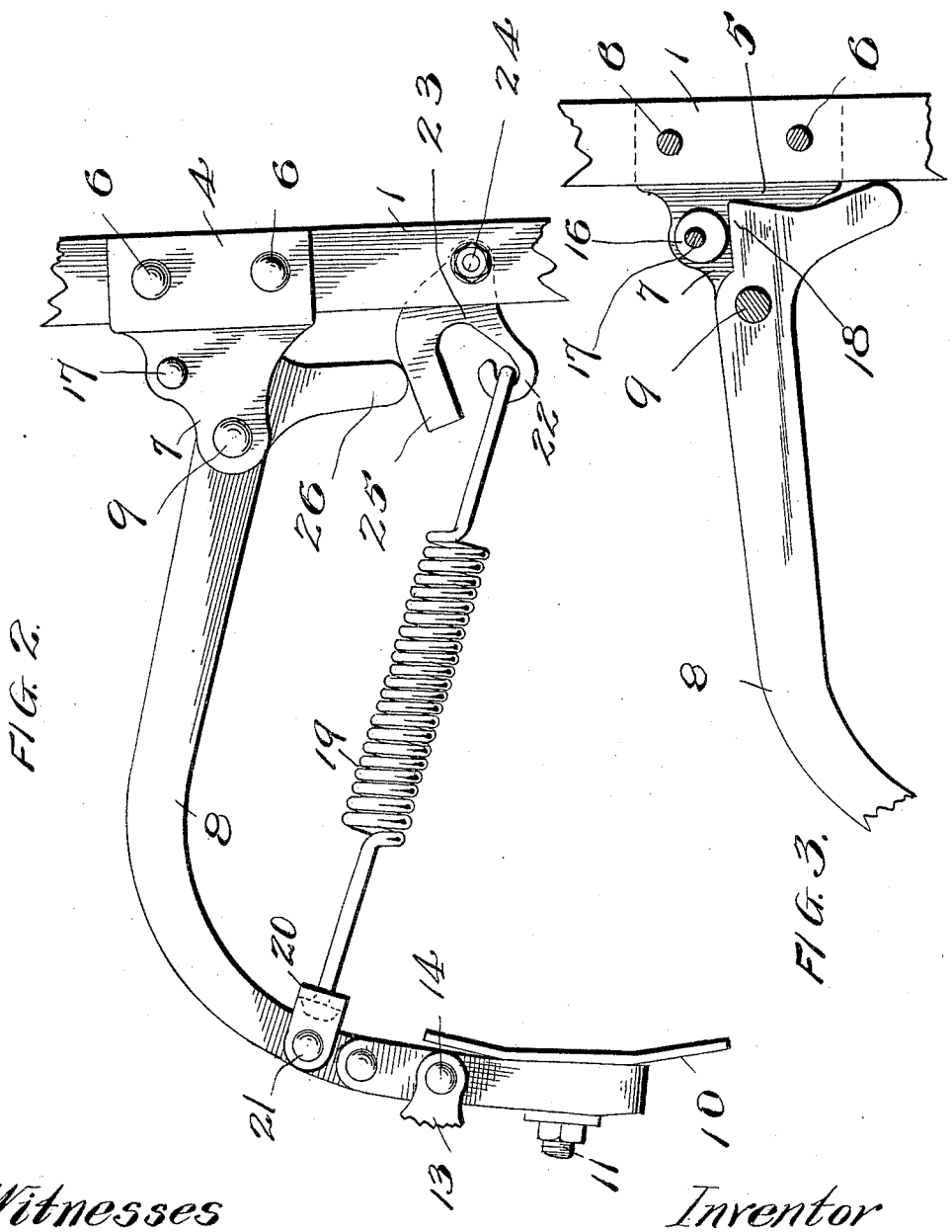

WILLIAM S. JOHNSON, OF GATESVILLE, TEXAS.

SEED-OPENING PLOW.

1,044,532.

Specification of Letters Patent. Patented Nov. 19, 1912.

Application filed July 26, 1912. Serial No. 711,690.

*To all whom it may concern:*

Be it known that I, WILLIAM S. JOHNSON, a citizen of the United States, residing at Gatesville, in the county of Coryell and State of Texas, have invented certain new and useful Improvements in Seed-Opening Plows, of which the following is a specification.

My present invention relates to improvements in seed opening plows for seed planters, and is designed to improve the construction of these devices in several particulars.

The essential object of the invention is the provision of an improved construction by means of which the plow and its beam, when the plow meets an obstruction and is pulled back, may be returned to original position after passing over the obstruction.

By the utilization of the novel arrangement of parts of my device I am enabled to produce a stronger, more compact, and durable construction for returning the plow to position after passing an obstruction.

A further object of the invention is the provision of means for adjusting the position of the plow beam and consequent adjustment of the plow, in addition to the means generally employed for adjusting the height of the plow on the beam.

The invention consists in certain novel combinations and arrangements of parts as hereinafter set forth and particularly pointed out in the claims.

Figure 1 is a side elevation of the plow and its connections, and shows the relation of parts to a seed planter. Fig. 2 is a view of the same parts in a position assumed when passing over an obstruction, and Fig. 3 is a detail sectional view of adjusting means.

In the accompanying illustrations the preferred embodiment of my invention is exemplified wherein the numeral 1 designates the vertical post for the forward plow 2 of the seed planter of which a portion of the frame 3 is indicated. The standard or post 1 is formed of two bars, as usual with a space therebetween, and the two clamp plates 4 and 5 are secured thereto, by means of the bolts 6. Each plate is formed with an ear or lug 7 between which the plow beam 8 is pivoted on the bolt 9. At its lower free end the beam 8 is provided with the usual seed opening plow 10 secured thereto by means of the devices 11 as usual. The spout 12 is attached to the seed receptacle in customary manner and projects into the cup or guard 13, pivoted at 14 to the plow beam. A spring 15 is provided which connects the cup 13 and beam 8, for the purpose of holding the cup against displacement. For the adjustment of the plow beam 8, and to prevent the beam falling and thus lowering the plow 10, I provide the washer 16 which is eccentrically arranged on the bolt 17 between the ears of the clamp plates.

By means of the washer the plow beam may be adjusted to locate the plow at varying depths, in addition to the usual adjustment by means of the bolt 11 and other parts. In connection with the washer, the beam 8 is provided with an extension 18 which is adapted to contact with the perimeter of the washer and thus regulate the depression of the plow 10. Located below the plow beam and connecting said beam with the post 1 is a strong pull spring 19 which is pivoted to the beam by means of the clip 20 and bolt 21, and at its other end is attached to a hook 22 formed integral with a plate 23, pivoted by means of the bolt 24 between the two bars of the post 1. The plate 23 is formed with a bar 25 against which a finger 26 of the beam 8 is continuously in contact, so that a more rigid connection of parts is attained.

As clearly seen in Fig. 2, when passing over an obstruction, the plow 10 is moved backward and upward as the plow beam swings on its pivot, and the spring is distended, the finger rides over the bar 25, thus holding the parts in compact relation to each other. The location of the spring under the beam is particularly advantageous and a very important feature in connection with low wheel planters, and by this arrangement of the spring under the beam many objectionable features heretofore encountered with pull-springs are eliminated, and a comparatively perfect arrangement is attained.

In the accompanying drawings I have illustrated one complete example of the physical embodiment of my invention constructed according to the best mode I have so far devised for the practical application of the principles of the invention, but it will be understood that slight changes within the scope of my claims may be made without departing from the spirit of the invention.

Having thus fully described my invention, what I claim as new and desire to secure by Letters Patent is:—

1. The combination with a standard and side plates secured thereto, of a pivoted plow beam formed with a shouldered extension, a washer eccentrically pivoted in said side plates to limit the movement of the beam, a pivoted member on the standard below the pivot of the beam in contact with said extension, and a spring connecting said member and the plow beam.

2. The combination with a standard and clamp plates secured thereto, of a plow beam pivoted between said plates and bent as shown, a spring connected to the beam, a contact member pivoted in the standard and having a hook for said spring, a portion of the beam below the pivot bearing on said contact member, and means above the pivot of the beam for limiting the movement of the beam.

In testimony whereof I affix my signature in presence of two witnesses.

WILLIAM S. JOHNSON.

Witnesses:
 FLORENCE HARRISON,
 J. F. CRENSHAW.

Copies of this patent may be obtained for five cents each, by addressing the "Commissioner of Patents, Washington, D. C."